(12) United States Patent
Guo et al.

(10) Patent No.: US 7,706,430 B2
(45) Date of Patent: Apr. 27, 2010

(54) SYSTEM, APPARATUS, AND METHOD FOR ADAPTIVE WEIGHTED INTERFERENCE CANCELLATION USING PARALLEL RESIDUE COMPENSATION

(75) Inventors: Yuanbin Guo, Irving, TX (US); Dennis McCain, Lewisville, TX (US); Joseph R. Cavallaro, Pearland, TX (US)

(73) Assignee: Nokia Corporation, Espoo (FI)

( * ) Notice: Subject to any disclaimer, the term of this patent is extended or adjusted under 35 U.S.C. 154(b) by 1092 days.

(21) Appl. No.: 11/067,498

(22) Filed: Feb. 25, 2005

(65) Prior Publication Data

US 2006/0193374 A1 Aug. 31, 2006

(51) Int. Cl.
*H04L 27/06* (2006.01)
(52) U.S. Cl. ............... 375/148; 375/343; 375/346; 375/147; 370/319; 370/320; 370/312
(58) Field of Classification Search ............ 373/343, 373/346, 148, 147; 370/319, 320, 321, 330, 370/335, 342, 345, 347; 342/150, 151, 152, 342/153, 154, 155; 333/193, 194, 195, 196
See application file for complete search history.

(56) References Cited

U.S. PATENT DOCUMENTS 5,838,742 A * 11/1998 Abu-Dayya ............ 375/347
6,069,912 A * 5/2000 Sawahashi et al. ......... 375/142

7,136,410 B2 * 11/2006 Choi et al. ............... 375/148

OTHER PUBLICATIONS

Xu et al., "Real-time implementation of the multistage detector for next generation Wideband CDMA systems", Proc. SPIE Conference on Advanced Signal Processing Algorithms, Architectures, and Implementations IX, vol. 3807, pp. 62-73, Jul. 1999.
Juntti et al., "Iterative Implementation of Linear Multiuser Detection for Dynamic Asynchronous CDMA Systems", IEEE Transactions on Communications, vol. 46, No. 4, pp. 503-508, Apr. 1998.
Varanasi et al., "Near-Optimum Detection in Synchronous Code-Division Multiple-Access Systems", IEEE Transactions on Communications, vol. 39, No. 5, pp. 725-736, May 1991.

(Continued)

*Primary Examiner*—Shuwang Liu
*Assistant Examiner*—Helene Tayong
(74) *Attorney, Agent, or Firm*—Hollingsworth & Funk, LLC

(57) ABSTRACT

A system, apparatus and method for a multi-stage Parallel Residue Compensation (PRC) receiver for enhanced suppression of the Multiple Access Interference (MAI) in Code Division Multiple Access (CDMA) systems. The accuracy of the interference estimation is improved with a set of weights computed from an adaptive Normalized Least Mean Square (NLMS) algorithm. In order to reduce complexity, the commonality of the multi-code processing is extracted and used to derive a structure of PRC to avoid direct interference cancellation. The derived PRC structure reduces the interference cancellation architecture from a complexity that is proportional to the square of the number of users to a complexity that is linear with respect to the number of users. The complexity is further reduced by replacing dedicated multiplier circuits with simple combinational logic.

17 Claims, 10 Drawing Sheets

OTHER PUBLICATIONS

Varansi et al., "Multistage detection in asynchronous code-division multiple-access communications", IEEE Transactions on Communications, vol. 38, pp. 509-519, Apr. 1990.

Divsalar et al., "Improved parallel interference cancellation for CDMA", IEEE Transactions on Communications, vol. 46, No. 2, pp. 258-268, Feb. 1998.

Xue et al., "Adaptive multistage parallel interference cancellation for CDMA", IEEE JSAC, vol. 17, pp. 1815-1827, Oct. 1999.

Guo et al., "Rapid scheduling of efficient VLSI architectures for next-generation HSDPA wireless system using Precision-C synthesizer", Proc. IEEE Intl. Workshop on Rapid System Prototyping '03, San Diego, CA, pp. 179-185, Jun. 2003.

Kim et al., "Fixed-point optimization utility for C and C++ based digital processing programs", IEEE Transactions on Circuits and Systems-II: Analog and digital signal processing, vol. 45, No. 11, pp. 1455-1464, Nov. 1998.

Sun et al., "A Pipelined Multi-Stage Parallel Interference Canceller for DCMA with Realistic Channel Estimation", WCNC 2002, IEEE Wireless Communications and Networking Conference, No. 1, Mar. 2002, pp. 294-298.

Correal et al., "A DSP-based DS-CDMA multiuser Receiver Employing Partial Parallel Interference Cancellation", IEEE JSAC, vol. 17, Apr. 1999, pp. 613-630.

Lee et al., "VLSI Architecture for an Advance DS/CDMA Wireless Communication Receiver", in Proc. of IEEE International Conference on Innovative Systems in Silicon, Oct. 1997, pp. 237-247.

* cited by examiner

SYSTEM, APPARATUS, AND METHOD FOR ADAPTIVE WEIGHTED INTERFERENCE CANCELLATION USING PARALLEL RESIDUE COMPENSATION

FIELD OF THE INVENTION

This invention relates in general to multiple access communication systems, and more particularly to a system, apparatus and method for enhancing suppression of multiple access interference.

BACKGROUND OF THE INVENTION

Generally speaking, cellular communication systems offer communication channels to multiple users within a given service area, e.g., cell, at the same time. Such communication channels include an uplink, i.e., a mobile terminal to base station communication channel, and a downlink, i.e., a base station to mobile terminal communication channel, to facilitate two-way, multiple access communication with a number of users. Regardless of which multiple access communication scheme is employed, however, the number of users that are serviceable in a given cell is bounded by an upper limit.

In a Time Division Multiple Access (TDMA) system, for example, the number of users that may be accommodated by the respective cell is bounded by the number of timeslots, M, that are available within the uplink and downlink frequency bands. Such frequency bands may be represented as contiguous time-frequency planes, where M timeslots are available within the time-frequency plane. For example, the number of mobile terminals able to simultaneously communicate with their respective base stations is equal to M, whereby the $M^{th}$ user transmits signal energy in the $M^{th}$ timeslot of the uplink using a low duty cycle. Receptions from the base station to the mobile terminal are similarly bounded in the downlink.

In a Code Division Multiple Access (CDMA) system, on the other hand, the signal energy is continuously distributed throughout the entire time-frequency plane, whereby each user shares the entire time-frequency plane by employing a wideband coded signaling waveform. Thus, the number of users that may be simultaneously accommodated in a CDMA system is not bounded by the number of timeslots available within the time-frequency plane, but is rather a function of the number of users present within the communication channel and the amount of Processing Gain (PG) employed by the CDMA system. The PG of a CDMA system is defined to be the ratio of the bandwidth of the spread signal in Hertz (Hz) to the data signal bandwidth in Hz.

The number of users transmitting within a given CDMA channel contributes to the total amount of undesired signal power received and is thus a measure of the jamming signal power resulting from multiple access users within the CDMA channel. Thus, depending upon the PG and jamming signal power present at the CDMA receiver, an upper limit may be calculated for the number of users that may be supported by a given CDMA channel.

For example, if the information bandwidth of the data signal to be transmitted is 9600 Hz and the transmission bandwidth of the data signal is 1.152 Megahertz (Mhz), then the PG=1152000/9600=120, or 20.8 decibels (dB). Furthermore, if the required bit energy-to-noise spectral density ratio ($E_b/N_0$) for acceptable performance of the CDMA communication system is equal to 6 dB, then the communicator can achieve its objective even in the presence of jamming signal power in excess of 14.8 dB. That is to say, that the jamming margin tolerated by the receiver is calculated to be 20.8−6=14.8 dB. Thus, if every user in the spread spectrum bandwidth supplies the identical amount of signal power to the base station antenna through a perfect power control scheme, regardless of location, then $10^{2.08}$=120 Multiple Access (MA) users may be accommodated by that CDMA channel.

The idea of a CDMA communication system, therefore, is to expend the jamming margin by accommodating the maximal number of co-channel communicators possible. As mentioned above, these co-channel communicators occupy the frequency-time plane simultaneously and thus account for the interference, or jamming power as seen at the CDMA receiver. In theory, Multiple Access Interference (MAI) caused by MA users within the CDMA channel can be reduced to zero if their respective signals are mutually orthogonal. In practice, however, co-channel interference, or cross-correlation from other codes, is still present, since delayed and attenuated replicas of the signals that arrive non-synchronously are not orthogonal to their primary components. Similarly, signals received from neighboring cells contribute to the MAI, since those signals are non-synchronous, and thus are not orthogonal to signals received from the home cell.

A conventional CDMA receiver demodulates each user's signal as if it were the only signal present by using a bank of filters that are matched to the user's signal waveform. Since the user's signal also contains cross-correlation from other codes, i.e., interference, the matched filters exhibit increasingly poor performance as the number of users increases, or as the relative power of the interference signals becomes large. Thus, it is imperative that the receiver be capable of determining which of N possible messages is the transmitted message in the presence of this interference.

It is well known that the Maximum Likelihood (ML) sequence detector, which is based on the maximum a posteriori probability (MAP) receiver principle, is the optimal receiver for performing such determinations in the presence of interference. The complexity of the ML sequence detector, however, is exponentially related to the number of codes being processed, which yields prohibitively challenging computational and storage implementations.

Prior art attempts to achieve a good trade-off between performance and complexity have spawned a number of Multi-User Detection (MUD) research activities. Among these, the multi-stage Parallel Interference Cancellation (PIC) technique, presents a promising algorithm for real time implementation because of its relatively low computational complexity and good performance. In particular, the Complete-PIC and the Partial-PIC algorithms have received attention in the literature.

Complete-PIC is a subtractive interference cancellation scheme that assumes that the symbol detection from a previous stage is correct. An MAI estimate is then made from the previous stage detection, which is then completely subtracted from the received signal. If some of the symbol detection is wrong, e.g., when the system load is high or the iteration is in its early stages, an erroneous interference estimate results, which when subtracted from the received signal may introduce even more interference than had previously existed. This phenomenon leads to the so-called "ping-pong" effect in the conventional Complete-PIC scheme.

In such situations, it is not preferable to cancel the entire estimated interference. Thus, a partial cancellation, i.e., Partial-PIC, of the MAI may be performed by introducing a weight in each stage. The weights are found by trial and error with the constraint that the value of each weight takes on values between 0 and 1. Although considerable capacity enhancement over the Complete-PIC algorithm is achieved by Partial-PIC, it is known that the choice of the weights used in each stage affects the performance significantly. Thus, incorrect selection of the weights has less than acceptable performance characteristics.

While MAI reduction techniques continue to develop, very few research activities have studied the viability of Very Large Scale Integration (VLSI) implementation of these techniques. While the Complete-PIC and Partial-PIC algorithms provide good performance with relatively low computational complexity, their real-time hardware implementations are still extremely challenging. Commercialization of these algorithms is particularly dependent upon finding a viable VLSI architecture that can apply the hardware resources efficiently to achieve low power and low cost in its design.

Accordingly, there is a need in the communications industry for an MAI reduction algorithm that further reduces computational complexity over existing techniques. In addition, the reduced computational complexity should compliment its VLSI implementation by utilizing features inherent with the MAI reduction algorithm. The present invention fulfills these and other needs, and offers other advantages over the prior art MAI reduction approaches.

SUMMARY OF THE INVENTION

To overcome limitations in the prior art described above, and to overcome other limitations that will become apparent upon reading and understanding the present specification, the present invention discloses a system, apparatus and method for a multi-stage, Parallel Residue Compensation (PRC) receiver for enhanced MAI suppression. The present invention allows an improvement in the MAI estimation accuracy through the use of user-specific weights computed from an adaptive Normalized Least Mean Square ALMS) algorithm. In this manner, direct interference cancellation is avoided and a reduction in the complexity of the algorithm is achieved by utilizing the commonality among multi-users and the features of the MAI suppression algorithm itself.

In accordance with one embodiment of the invention, a multi-stage, Normalized Least Mean Square (NLMS) based, Parallel Residue Compensation (PRC) receiver comprises a matched filter stage that is coupled to receive a multiuser signal and is adapted to provide data symbols representing demodulated bit stream groupings for each user. The receiver further comprises a signal reconstructor that is coupled to receive the data symbols and is adapted to generate modulated representations for each users' data symbols to produce a replica of the multiuser signal, an NLMS block that is coupled to receive the replica of the multiuser signal and is adapted to compute a weighted estimation of the replica, and a parallel compensation residue (PRC) block that is coupled to receive the weighted estimation of the replica and the multiuser signal and is adapted to generate a common residual error signal from the weighted estimation of the replica and the multiuser signal. The common residual error signal is ultimately subtracted from each users' data symbols to cancel interference associated with each users' data symbols In accordance with another embodiment of the invention, a method of estimating symbols transmitted from a plurality of users in a multiuser communication system comprises calculating a weighted estimation of a multiuser signal, generating a common residual signal using a subtraction of the weighted estimation of the multiuser signal from the multiuser signal, compensating each user's signal with the common residual signal to obtain an interference cancelled signal for each user, and filtering the interference cancelled signal for each user to obtain estimates of each user's transmitted symbols.

In accordance with another embodiment of the invention, a Code Division Multiple Access (CDMA) chip set is contemplated, which contains a Normalized Least Mean Square (NLMS) based Parallel Residue Compensation (PRC) receiver. The receiver comprising a signal reconstruction circuit that is coupled to receive a multiuser signal and is adapted to provide data symbols representing demodulated bit stream groupings for each user and is further adapted to generate modulated representations for each users' data symbols to produce a replica of the multiuser signal. The CDMA chip set based receiver further comprises an NLMS circuit that is coupled to receive the replica of the multiuser signal and is adapted to accumulate first and second weighting signals generated as a difference between the multiuser signal and a weighted replica of the multiuser signal, where the replica of the multiuser signal includes a first spreading code bit stream and first and second data streams. The CDMA chip set based receiver further comprises a parallel compensation residue (PRC) circuit that is coupled to receive the weighted replica of the multiuser signal and is adapted to generate first and second error signals from the weighted replica of the multiuser signal. The first and second error signals being subtracted from each users' data symbols to cancel interference associated with each users' data symbols.

In accordance with another embodiment of the invention, a method is contemplated for implementing a Normalized Least Mean Square (NLMS) based Parallel Residue Compensation (PRC) receiver to reduce multiple access interference for each user of a multiuser signal. The method comprises establishing two parallel processing paths to operate on two groups of users, wherein each processing path is implemented with combinational logic to serially operate on each group of users. The serial operation in each processing path includes estimating symbols for each user of a group of users, computing weighted symbols for each user of a group of users, computing weighted sum chip signals for each user of the group of users, generating a detected bit vector from the weighted sum chip signals for each user, generating a difference between each bit of the detected bit vector and each user's symbol estimation, adding the difference to the weighted symbols for each user, and generating an interference canceled signal for each symbol once all bits of the detected bit vector are processed.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a fer part hereof, and to accompanying descriptive matter, in which there are illustrated and described representative examples of systems, apparatuses, and methods in accordance with the invention.

BRIEF DESCRIPTION OF THE DRAWINGS

The invention is described in connection with the embodiments illustrated in the following diagrams.

DETAILED DESCRIPTION OF EMBODIMENTS OF THE INVENTION

Figure 1:
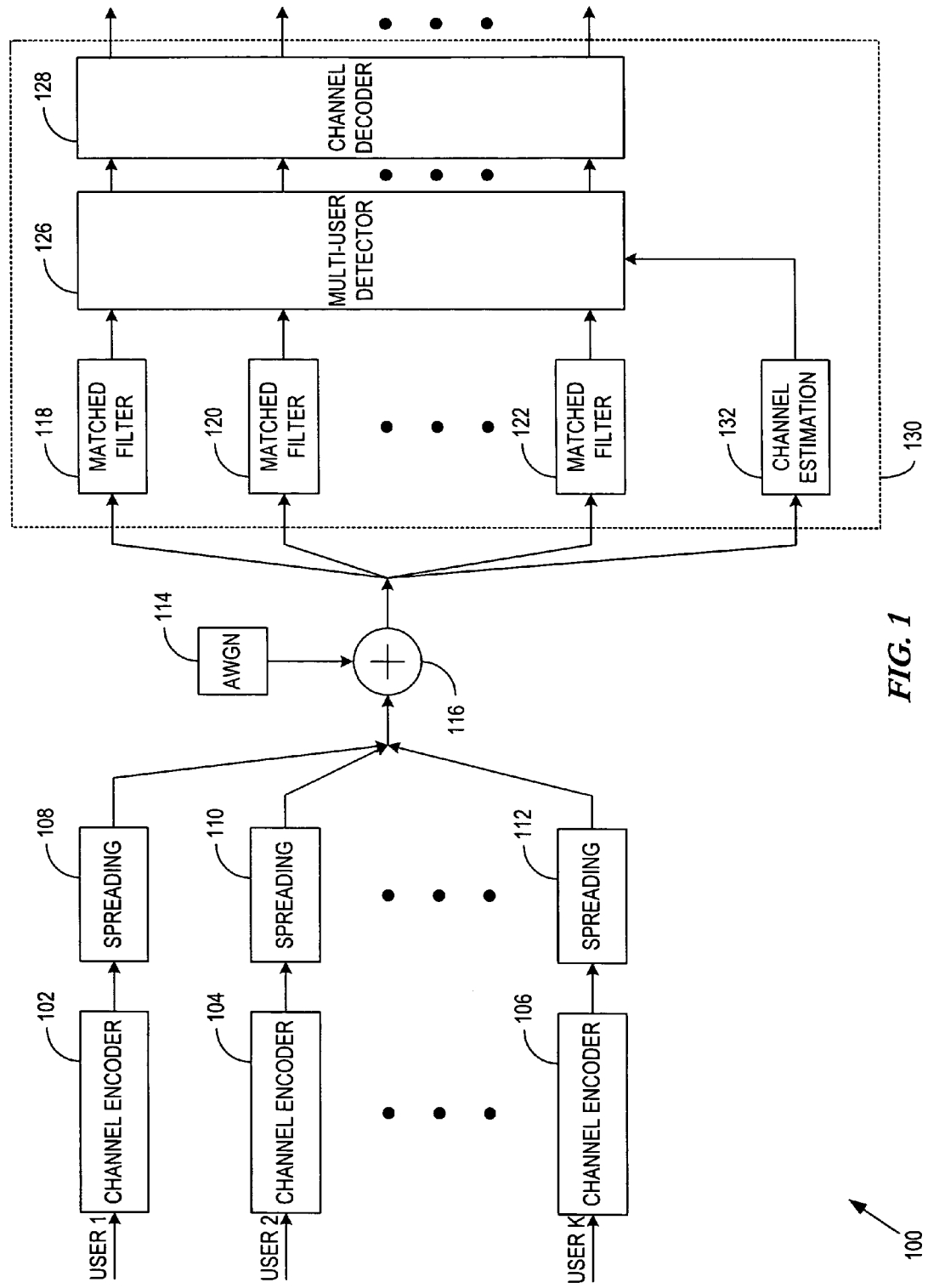
FIG. 1 illustrates an exemplary system diagram of a multiuser communication system.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

In the following description of various exemplary embodiments, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention provides a novel, multi-stage Parallel Residue Compensation (PRC) receiver architecture for enhanced suppression of the Multiple Access Interference (MAI) in Code Division Multiple Access (CDMA) systems. The accuracy of the interference estimation is improved with a set of weights computed from an adaptive Normalized Least Mean Square (NLMS) algorithm. The algorithm achieves significant performance gain over the conventional Parallel Interference Cancellation (PIC) algorithms that assume either complete or partial interference cancellation.

In order to reduce complexity, the commonality of the multi-code processing is extracted and used to derive a structure of PRC to avoid the direct interference cancellation. The derived PRC structure reduces the interference cancellation from a complexity that is proportional to the square of the number of users, to a complexity that is linear with respect to the number of users.

Furthermore, the present invention contemplates a scalable System-on-Chip (SoC) VLSI architecture using simple Sumsub-MUX-Unit (SMU) combinational logic. The proposed architecture avoids the use of dedicated multipliers, which is effective to render at least a factor of ten improvement in hardware resource allocation. An efficient, Precision-C based High Level Synthesis (HLS) design methodology is applied to implement these architectures in an FPGA system. Hardware efficiency is achieved by investigating multi-level parallelisms and pipelines, which yields a substantial improvement over conventional design.

In one embodiment according the principles of the present invention, implementation of the enhanced MAI suppression algorithm is within an Application Specific Integrated Circuit (ASIC) that is further integrated within the physical layer (PHY) processing engines of the respective CDMA chip set. Included within the implementation are the pipelined architectures for NLMS weight updating, PRC, and matched filter components. In addition, the present invention contemplates optimization of the logic elements to replace the dedicated multipliers with SMU combinational logic. In an alternate embodiment, a Digital Signal Processor (DSP) may be used as long as the appropriate level of parallelism and pipelining can be achieved for the required real time processing of the time critical blocks.

Application of the present invention is contemplated for any cellular communications algorithm utilizing spread spectrum techniques within base stations and mobile terminals. Such communication systems include CDMA systems that comply, for example, with the CDMA2000, Wideband CDMA (WCDMA), High Speed Downlink Packet Access (HSDPA) system for WCDMA, and other high-capacity, multiple access communication protocols.

FIG. 1 represents an exemplary system diagram for a multi-user communication system 100, whereby user 1 through user K represent K users of a CDMA uplink physical layer to the corresponding base station (not shown). While emphasis is placed on the CDMA uplink of FIG. 1, it is understood by those of ordinary skill in the art that the corresponding downlink is also present, but not shown. Users 1-K share a common, single path channel 116 with noise estimated as Additive White Gaussian Noise (AWGN) 114, whereby distinguishing one user from the next involves the use of orthogonal, or nearly orthogonal, codes to modulate the transmitted bits. The orthogonal codes, or so-called spreading sequences, of spreading blocks 108-112 perform the necessary modulation.

Channel encoders 102-106 provide error correction capability to multi-user communication system 100, whereby discrete-time input sequences are mapped to discrete time output sequences exhibiting redundancy. Such redundancy is effective to provide a noise-averaging feature, which makes channel decoder 128 less vulnerable to channel effects due to noise, distortion, fading, and the like.

CDMA communication system 100 may employ any number of modulation schemes, but for sake of illustration, a QuadriPhase Shift Keying (QPSK) modulation scheme within spreading blocks 108-112 is discussed. Using such a modulation scheme, the $n^{th}$ data symbol for the $k^{th}$ user at the transmitter is mapped to constellation points using a group of binary bits $\{b_k^0(n), b_k^1(n)\} \in \{0,1\}$. The symbol output at the modulator (not shown) is represented by:

$$s_k^{(n)} = \{[-2b_k^0(n)+1]+[-2b_k^1(n)+1]j\}/\sqrt{2} \quad (1)$$

with equal probability. In an AWGN channel, the complex baseband signal received at receiver 130 at the $i^{th}$ chip of the $n^{th}$ symbol is expressed as:

$$r^{(n)}(i) = \sum_{k=1}^{K} \alpha_k^{(n)} \sqrt{P_k^{(n)}}\, s_k^{(n)} (c_k[i+(n-1)N]) + z(i) \quad (2)$$

where $\alpha_k^{(n)}$ and $P_k^{(n)}$ are the complex channel amplitude and transmitted power for the $k^{th}$ user. $c_k[i+(n-1)N]$ is the $i^{th}$ chip spreading code of the $n^{th}$ symbol for the $k^{th}$ user and takes the value of $\{+/-1\}$. N is the spreading factor, $K \in [1, N]$ is the number of active users, and z(i) is the sample of the complex additive Gaussian noise with double-sided spectral density $N_0/2$.

By collecting the N chip samples in one symbol duration into a vector, an expression for the received vector may be expressed as:

$$\bar{r}=[r(0)r(1)\ldots r(N-1)] \quad (3)$$

Matched filters 118-122 may be used to de-spread the received signal and to generate the soft estimation of the multi-users' symbol as:

$$\tilde{S}_{MF0}=\bar{r}\bar{C}^H/N=A\cdot S^*\mathfrak{R} \quad (4)$$

where $\mathfrak{R}=[\bar{C}^*\bar{C}^H]/N$ is the cross correlation matrix of the spreading codes and superscript H denotes the Hermetian conjugate. MAI appears when the cross correlation matrix $\mathfrak{R}$ is not equal to identity. The elements of $\tilde{S}_{MF0}$, i.e., the $k^{th}$ user's symbol estimation, is given by:

$$\tilde{s}_k = \alpha_k\sqrt{P_k}\,s_k + \frac{1}{N}\sum_{\substack{j=1\\ j\neq k}}^{K}\sum_{i=0}^{N-1}\alpha_j\sqrt{P_j}\,s_j c_j(i)\,c_k^*(i) \quad (5)$$

The matched filter output is then corrected by the channel estimation phase using channel estimation block 132 and multi-user detector 126 and sent to channel decoder 128 for multi-users. At the decoder, the estimated bits are detected as:

$$\tilde{b}_0=\operatorname{sgn}\{Re(\tilde{S}_{MF0}\cdot/\hat{A})\} \quad (6)$$

$$\tilde{b}_1=\operatorname{sgn}\{Im(\tilde{S}_{MF0}\cdot/\hat{A})\} \quad (7)$$

where "./" denotes dot division. The elements of vectors (6) and (7) are given by:

$$\{\tilde{b}_0(k)=\operatorname{sgn}[Re(\tilde{S}_{MF0}(k)/\hat{\alpha}_k)],\tilde{b}_1(k)=\operatorname{sgn}[Im(\tilde{S}_{MF0}/\hat{\alpha}_k)]\} \quad (8)$$

A particular group of multi-user detectors used in the implementation of multi-user detector 126 is based upon Interference Cancellation (IC), especially Parallel Interference Cancellation (PIC). The concept is to cancel the interference generated by all users other than the desired user, since lower computational demand and hardware related structures may be realized using PIC. Conventionally, an iterative multi-stage PIC method is used, whereby the inputs of one particular stage are the estimated bits of the previous stage. By assuming the bit estimation of the $(m-1)^{th}$ stage as the transmitted bits for each user, estimates of the interference at the $m^{th}$ stage for each of the users is determined by reconstructing the signal excluding the particular user.

As discussed above, however, if the estimation of the early stages is not accurate enough, the PIC algorithm may introduce even more interference to the signal. Thus, to achieve more accurate interference cancellation, a set of partial weights is introduced for each stage, in accordance with the present invention. Individual weights are chosen for each user depending upon the accuracy of the symbol estimation. By defining a cost function in terms of the squared Euclidean distance between the received signal r(i) and the weighted sum of all users' estimated signal, the optimal weights are given by minimizing the Mean Squared Error (MSE) of the cost function, $$w_{opt}^{(m)}=\arg_{w^{(m)}}\min E[|r(i)-\hat{r}_W^{(m)}(i)|^2] \quad (9)$$

where the weighted sum of all users' hard decision symbols at the $m^{th}$ stage is given by $$\hat{r}_W^{(m)}(i) = \sum_{k=1}^{K} w_k^{(m)}[c_k(i)\hat{s}_k^{(m-1)}] = w^{(m)}\hat{\Omega}^{(m-1)}(i) \quad (10)$$

Here, $w^{(m)}=[w_1^m w_2^m \ldots w_K^m]$ is the weighting vector for the $m^{th}$ stage and $\hat{\Omega}^{(m-1)}(i)=[c_1(i)\hat{s}_1^{(m-1)} c_2(i)\hat{s}_2^{(m-1)} \ldots c_K(i)\hat{s}_K^{(m-1)}]^T$ is the output vector of the multi-user spreader in the reconstructor of the PIC.

Defining the residual error between the desired response and its estimate in the $m^{th}$ stage as $\epsilon^{(m)}(i)=r(i)-\hat{r}_W^{(m)}(i)$, the MMSE optimization of equation (9) is solved by the Normalized Least-Mean-Square (NLMS) algorithm in an iterative update equation operated in the bit interval on chip rate, $$w^{(m)}(i+1) = w^{(m)}(i) + \frac{\mu}{\left\|\hat{\Omega}^{(m-1)}(i)\right\|^2}\left[\hat{\Omega}^{(m-1)}(i)\right]^*\varepsilon^{(m)}(i), \quad (11)$$

$$w_{opt}^{(m)} = w^{(m)}(N-1),$$

where $\mu$ is the step size and $\hat{\Omega}^{(m-1)}$ is the input vector to the NLMS algorithm. The interference for each user in the adaptive PIC is estimated in a direct form for all the K users as $$\hat{I}_k^{(m)}(i) = \sum_{\substack{j=1\\ j\neq k}}^{K} w_j^{(m)}(N-1)[c_j(i)\hat{s}_j^{(m-1)}]. \quad (12)$$

The chip-level signal with interference cancelled is generated for each user as $$\tilde{\gamma}_k^{(m)}(i)=r(m)-\hat{I}_k^{(m)}(i) \quad (13)$$

and symbols are detected as $$\tilde{s}_k^{(m)} = \frac{1}{N}\sum_{i=0}^{N-1}\tilde{\gamma}_k^{(m)}(i)c_k^*(i). \quad (14)$$

Since the computational complexity determines the cost of necessary hardware resources such as the number of functional units, it is one of the most important considerations in the implementation of PIC schemes. The complexity of direct form PIC in one chip for K users is 4K*(K−1) real multiplications, 2K(K−1) real additions, and 2K subtractions. Moreover, there is one "if" statement which is mapped to a hardware comparator for each user loop, which makes the loop structure irregular and non-conducive to pipelining. In accordance with the present invention, therefore, the regularity of the computations for all users is considered, whereby the order of "interference estimation" and "interference cancellation" is changed.

The architecture in accordance with the present invention, therefore, performs the following steps. First, a weighted sum chip function is calculated by summing all of the users' weighted signal together to obtain the weighted estimation of the received signal in chip rate samples as, $$\hat{r}_{W,opt}^{(m)}(i) = \sum_{k=1}^{K} w_k^{(m)}(N-1)[c_k(i)\hat{s}_k^{(m-1)}]. \quad (15)$$

Second, a common residual signal for all users is generated by a single subtraction from the original signal as, $$\epsilon^{(m)}(i) = r(i) - \hat{r}_{W,opt}^{(m)}(i). \quad (16)$$

Third, the residual error is compensated to each user to get the interference-cancelled chip signal, $$\tilde{\gamma}_k^{(m)}(i) = \epsilon^{(m)}(i) + w_k^{(m)}(N-1)\lfloor c_k(i)\hat{s}_k^{(m-1)}\rfloor. \quad (17)$$

Finally, the multi-user "chip matched filter" may be carried out on the corrected signal as in equation (14) above. Thus, the procedure outlined in the four steps above implements a Chip-Level PRC (CL-PRC) structure.

Furthermore, by jointly considering the matched filter and the residue compensation step in equations (15), (16), and (17), the $0^{th}$ stage multi-user matched filter output can be utilized to generate the Symbol-Level PRC (SL-PRC) architecture. The "spreading" and then "matched filter" procedure for the weighted symbols of each user is redundant in chip level. Matched filtering, therefore, is only necessary for the weighted-sum chips and it is performed as $$\hat{R}_{W,MF}[k] = \frac{1}{N}\sum_{i=0}^{N-1} \hat{r}_{W,opt}^{(m)}(i) c_k^*(i), \quad (18)$$

and the soft-decision matched filter output of the corrected signal is finally generated in the symbol level as $$\tilde{s}_k^{(m)} = \tilde{S}_{MF0}[k] - \Re_{W,MF}[k] + ws[k]. \quad (19)$$

The optimally Weighted Symbol (WS) of equation (13) may be computed as $$ws[k] = w_k^{(m)}(N-1)\hat{s}_k^{(m-1)} \quad (20)$$

prior to the spreading of equation (13) and may be subsequently stored in registers or arrays.

A summary of the complexities for the Direct-Form (DF) PIC structure, the CL-PRC structure, and the SL-PRC structure is presented in Table 1. It can be seen that

TABLE 1

| Algorithm | Multiplication Factor | Addition/Subtraction Factor |
|---|---|---|
| DF-PIC | $4K^2 \cdot N$ | $(2 \cdot K^2 - 1) \cdot N$ |
| CL-PRC | $5K \cdot N$ | $(4K - 2) \cdot N$ |
| SL-PRC | $5K \cdot N$ | $(3K - 2) \cdot N + K$ | the interference cancellation complexity is reduced from the order of $O(K^2 \cdot N)$ in DF-PIC to $O(K \cdot N)$ in the PRC architectures, which is linear to the number of users. Although the SL-PRC architecture is similar to the CL-PRC, the loop chain for chip index of the SL-PRC architecture is more compact and regular for scheduling the pipelined and parallel architecture, thus the SL-PRC architecture tends to generate a faster design as compared to the CL-PRC architecture.

Figure 2:
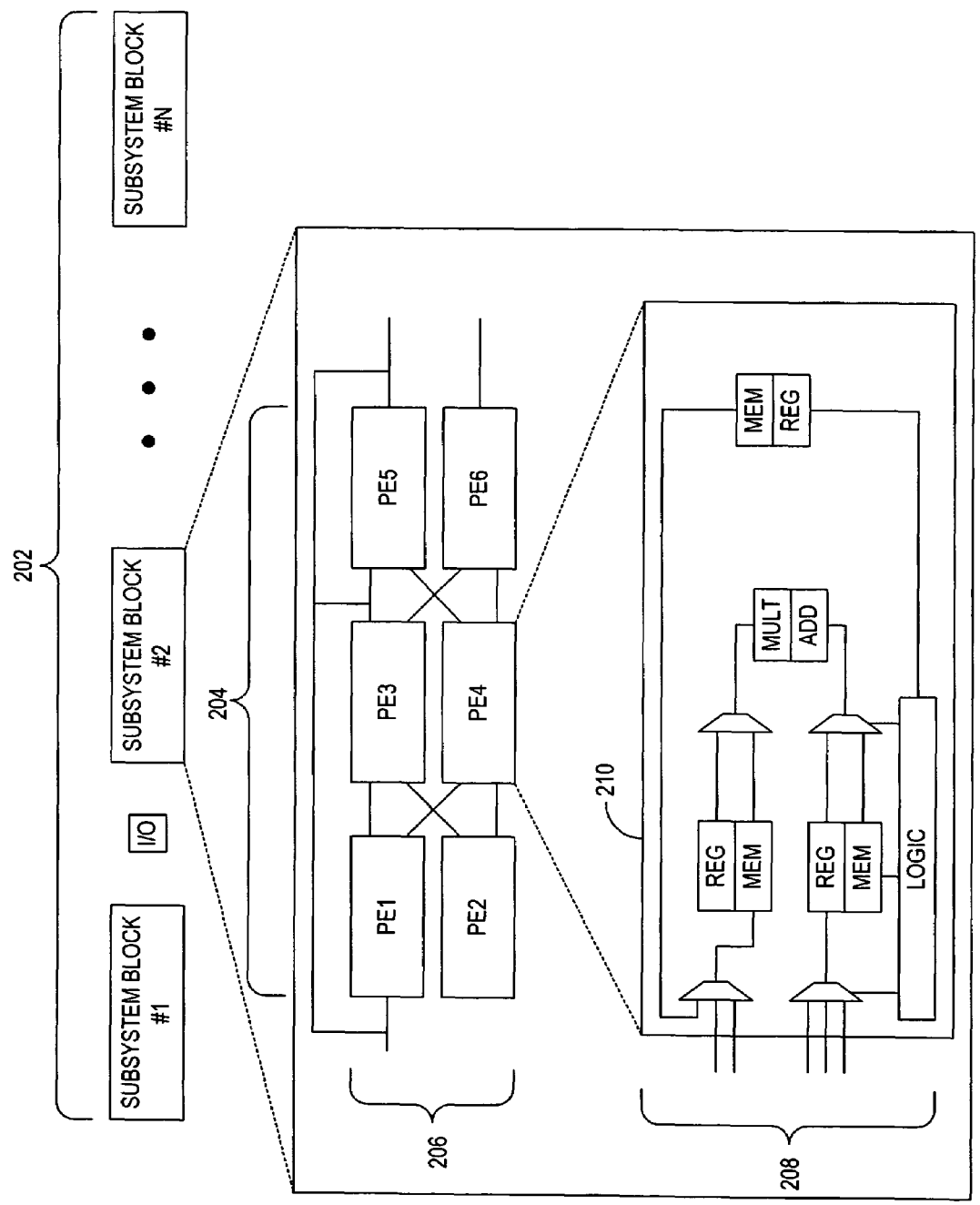
FIG. 2 illustrates an exemplary System-on-Chip (SoC) architecture in accordance with the present invention.

Turning to FIG. 2, a conceptual SoC architecture according to the principles of the present invention is exemplified that provides a scalable verification solution that addresses all aspects of the design cycle and reduces the verification gap. The system level VLSI design of FIG. 2 exemplifies one embodiment of the NLMS based adaptive PRC architecture and it is partitioned into several Subsystem Blocks (SB) according to the respective functionality and timing relationships exhibited by each SB. Each SB represents one Precision-C design block, where each SB is cascaded in pipeline configuration 202 through, for example, the use of an appropriate Hardware Design Language (HDL) designer. Each SB consists of several Processing Elements (PE) that are configured either in pipeline configuration 204 and/or parallel configuration 206. The pipelining and parallelism in the PE level reflects the loop structures in the algorithm and has the most opportunity for optimization. The PEs are mapped to the hardware resources of Functional Units (FU) 210, which include registers, memory, multipliers, adders, etc., each exhibiting an additional level of parallel configuration 208.

Figure 3:
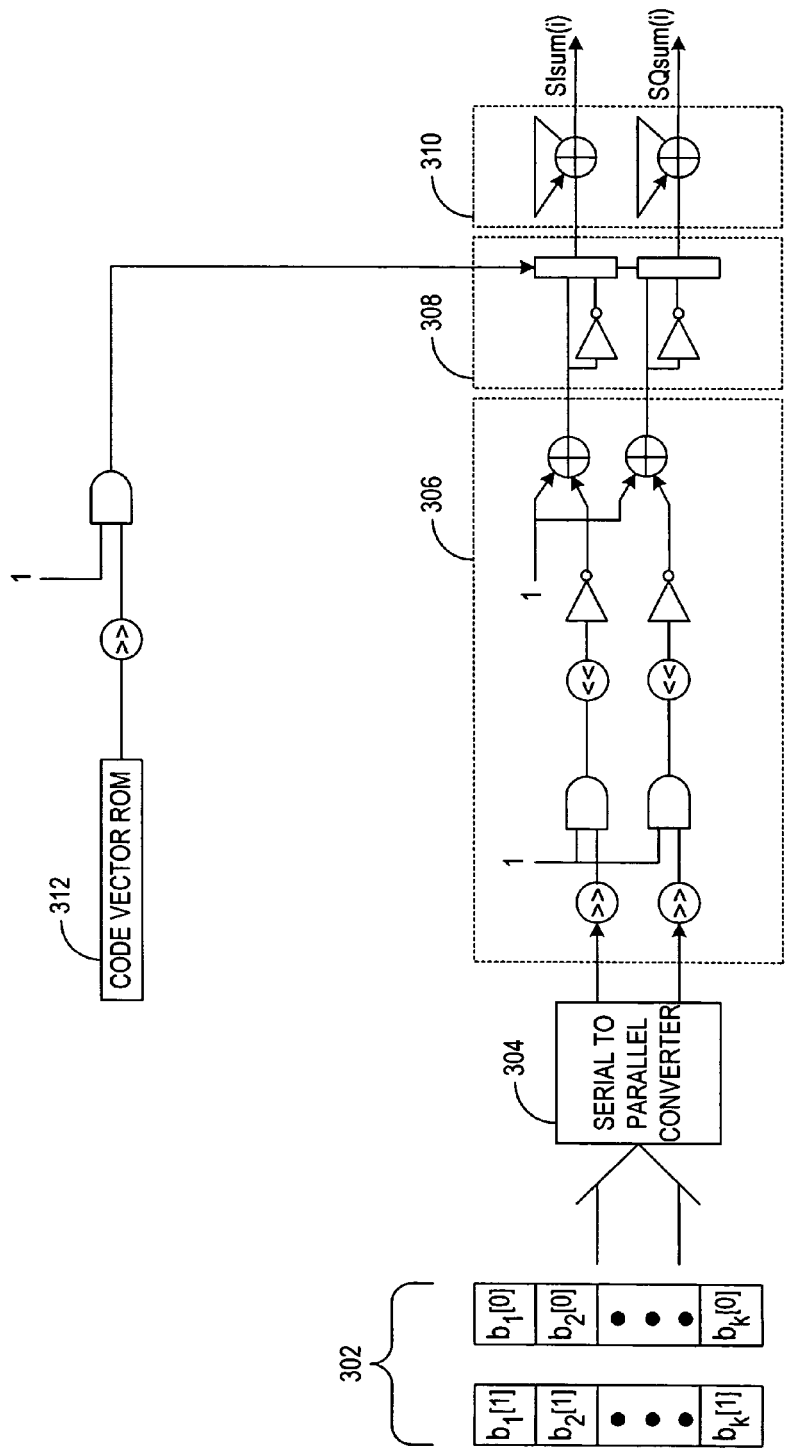
FIG. 3 illustrates an exemplary area constraint architecture for a modulator in accordance with the present invention.

Turning to FIG. 3, an exemplary area constraint architecture for bit-vector joint modulator 306, spreader 308, and multi-code combiner 310 in accordance with the present invention is illustrated. At the transmitter, the input bit streams for K users are packed into single-word bit vector buffer 302, such that $$B[n] = \sum_{k=1}^{K} b_k(n) 2^{k-1} \quad (21)$$

in order to save storage resources. The spreading codes for K users may also combine to form code vector ROM 312 as $$C[i] = \sum_{k=1}^{K} c_k(n) 2^{k-1}. \quad (22)$$

Bits are read from vector buffer 302 and converted to parallel, I/Q bit streams via serial to parallel converter 304. In the hardware configuration of FIG. 3, bit vector joint modulator 306 and spreader 308 are merged to apply the commonality on the loop architecture. The multiplication of spreader 308 is designed using bit-level combinational logic to avoid the usage of multipliers. The script for the combinational logic hardware design is illustrated in the following code segment (23) as follows:

```
for (i=0; i<N-1; i++){
    for (k=1; k<=K; k++){
        c_k(i) = [(C[i] >> k) & 1];
        SI_k = {[(B[0] >> k) & 1} + 1;         (23)
        SQ_k = {[(B[1] >> k) & 1} + 1;
        if (c_k(i) == 0){
            SI_sum(i) += -SI_k; SQ_sum(i) += -SQ_k;
        else if (ck(i) != 0){
            SI_sum(i) += SI_k; SQ_sum(i) += SQ_k;}
        }
    }
```

While the K users can be logically processed in parallel, all K users may be processed in serial while meeting the real-time requirement, provided that the system clock is fast enough. As can be seen by inspection of FIG. 3, efficient VLSI architectures are designed using combinational logic, where modulator 306 and spreader 308 utilize shift registers, AND gates, and multiplexers controlled by the spreading code bits of the K users. Multi-code combiner 310 utilizes an accumulator architecture to produce signals SIsum(i) and SQsum(i), which can achieve the real-time requirement for K users using minimum design area.

Figure 4:
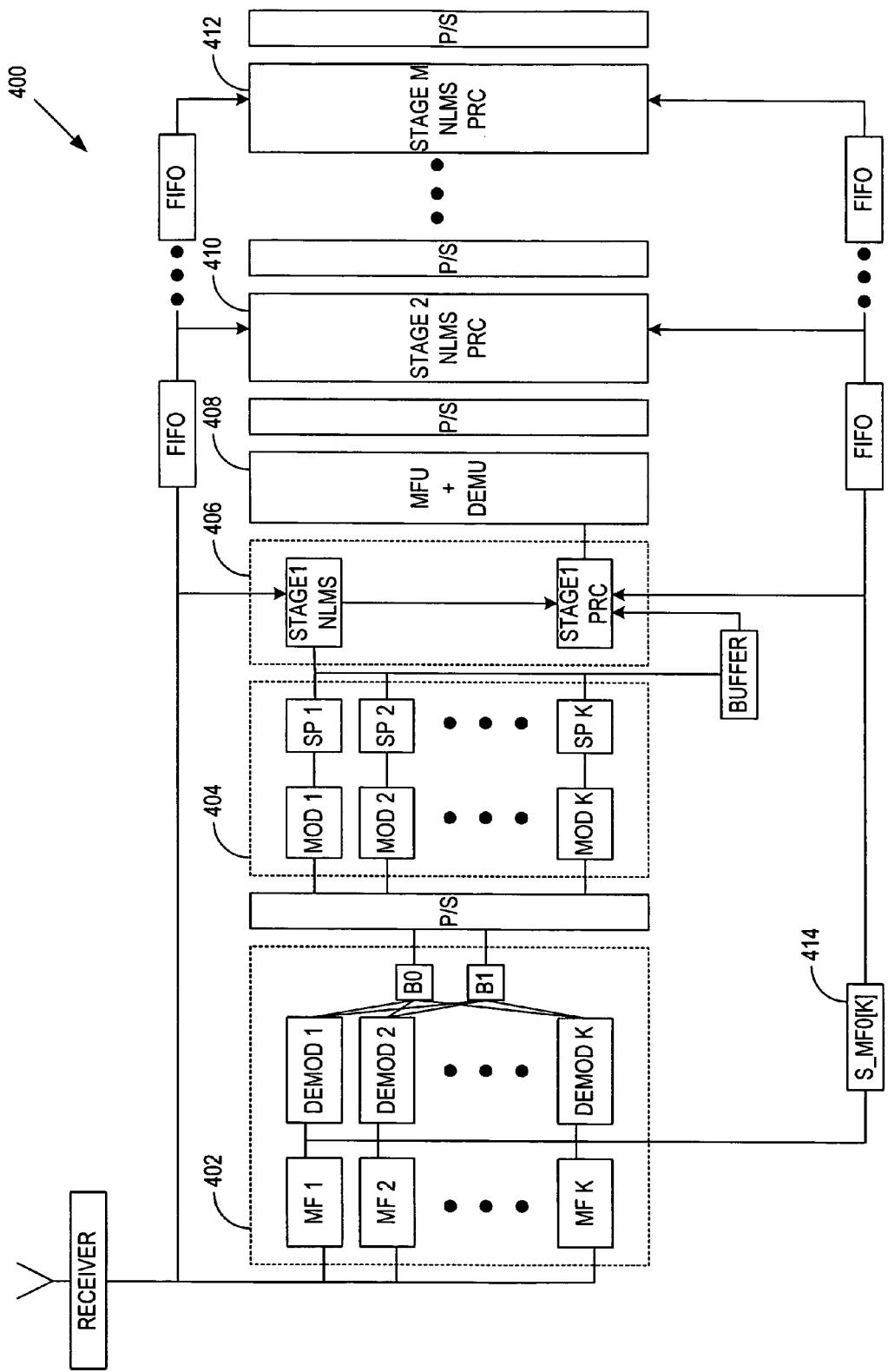
FIG. 4 illustrates an exemplary system level architecture for a multi-stage, Normalize Least Mean Square (NLMS) receiver according to the present invention.

Turning to the receiver partitioning block diagram of FIG. 4, loop structures and intrinsic timing in the algorithm are optimized to achieve pipelining and parallelism and are further optimized to reduce redundant computations, avoid timing conflicts, and share functional units as well as registers and memories. It can be seen that functional units 402-412 are logically combined for optimization.

System level architecture 400 for the multi-stage NLMS receiver according to the present invention utilizes a multi-code matched filter as a first stage within functional unit 402. The first stage matched filter output for K codes is stored in memory block S_MF0[K] 414 for the symbol level PRC. At the output of demodulators DEMOD 1-DEMOD K, the detected bits for K users are packed into two words, B0 and B1, for QPSK modulation. Reconstructor 404 receives the detected bits after parallel to serial conversion, so that signal reconstruction using the detected bits may be implemented via modulators MOD 1-MOD K and spreading units SP 1-SP K. The output of reconstructor 404 is passed to the stage 1 NLMS block of functional unit 406 for weight computation, while being simultaneously buffered for stage 1 PRC processing. The signal after interference cancellation is detected by merged Matched Filter and Demodulator Units (MFU+DEMU) 408 for K users. Multiple stage hardware units for NLMS-PRC blocks 410-412 are laid out for M stages in pipelined mode, where the detected bits are passed to later stages M for multi-stage processing and FIFOs are optionally applied to balance the processing latency in the various chains.

Figure 5:
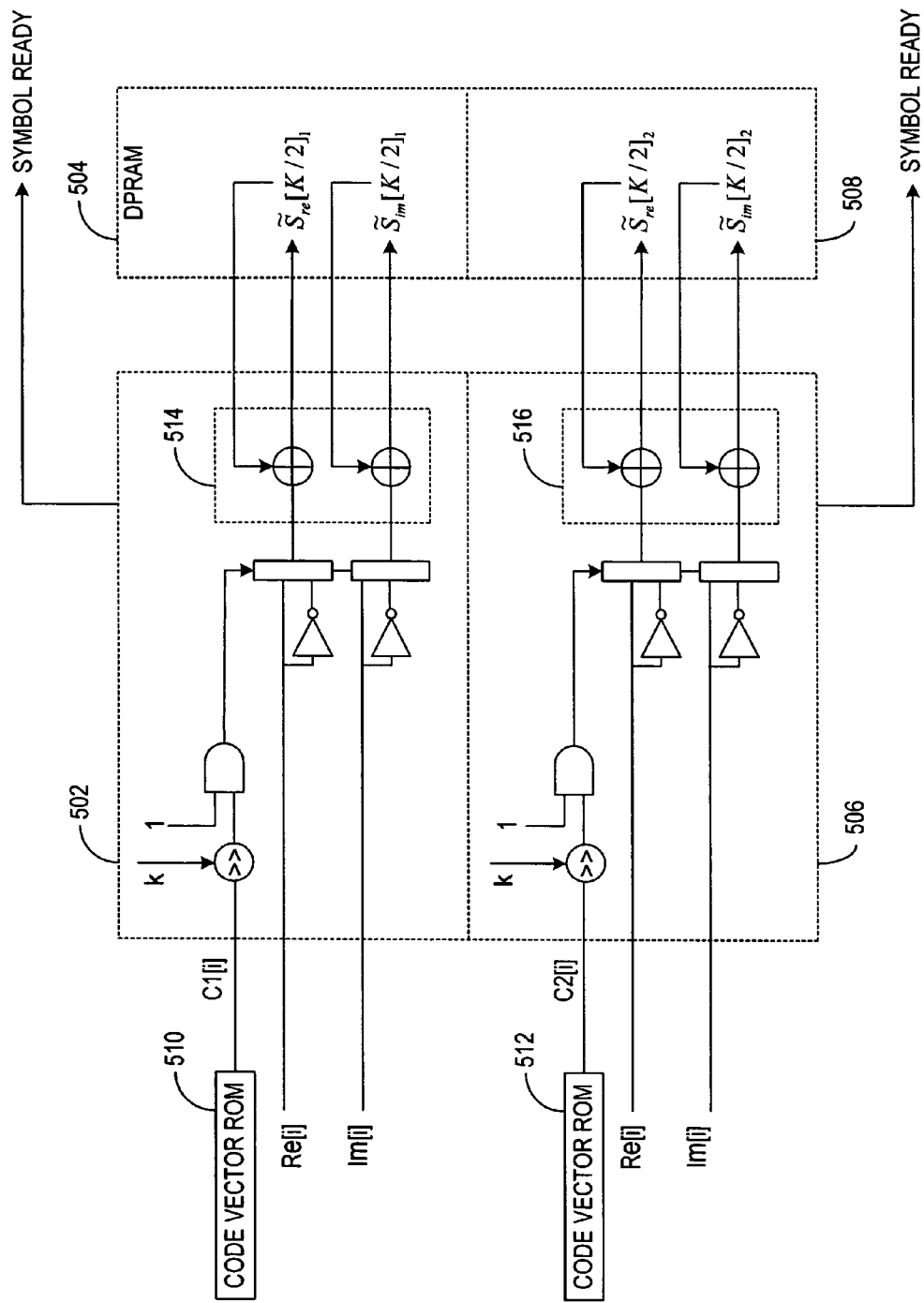
FIG. 5 illustrates an exemplary multi-user matched filter block in accordance with the present invention.

FIG. 5 illustrates an exemplary embodiment of multi-user matched filter block 402 of FIG. 4, whereby the architecture is designed with two, parallel DeSpreader Unit (DSU)+MFU engines 502 and 506. The design is implemented with combinational logic by utilizing the features of the spreading codes in order to obviate the need for multiplier circuits. The K users are broken down into two groups of K/2 users, where the users in each group utilize one PE in serial as exemplified, for example, in FIG. 2. The temporary results from the MFUs are stored in individual Dual Port Random Access Memory (DPRAM) vectors 504 and 508, respectively, and subsequently accumulated by accumulators 514 and 516, respectively. For each input chip sample, Re[i] and Im[i], K/2 users spreading codes C1[i] and C2[i] are shifted in serial from the code vector ROMs 510 and 512, respectively, for multiplication with the chip samples. Once a symbol has been accumulated by accumulators 514 and 516, signal SYMBOL READY is asserted to indicate the need for the demodulator unit to read the symbol estimates.

As discussed above, NLMS stage 1 through M represents a significant throughput bottleneck, since the algorithm utilizes division and multiplication operations as exemplified by equation (11) with feedback extensively. The NLMS design block receives the chip-based complex NLMS algorithm and computes the optimal weights for all users in each symbol as described by equations (10) and (11). To map the adaptive NLMS algorithm of the present invention into hardware, particular attention is given to data flow and timing for efficient partitioning.

Conventional methods of mapping the LMS algorithm into parallel and pipelined architectures either introduce delays in the coefficient updates or impose excessive hardware requirements. In accordance with the present invention, however, hardware efficient pipelined architectures are contemplated for the NLMS adaptation that provides substantially the same output and error signals as that of a standard LMS architecture without the associated delays. Furthermore, the architecture's throughput in accordance with the present invention is independent of the length of the input vector, i.e., the number of users.

Figure 6:
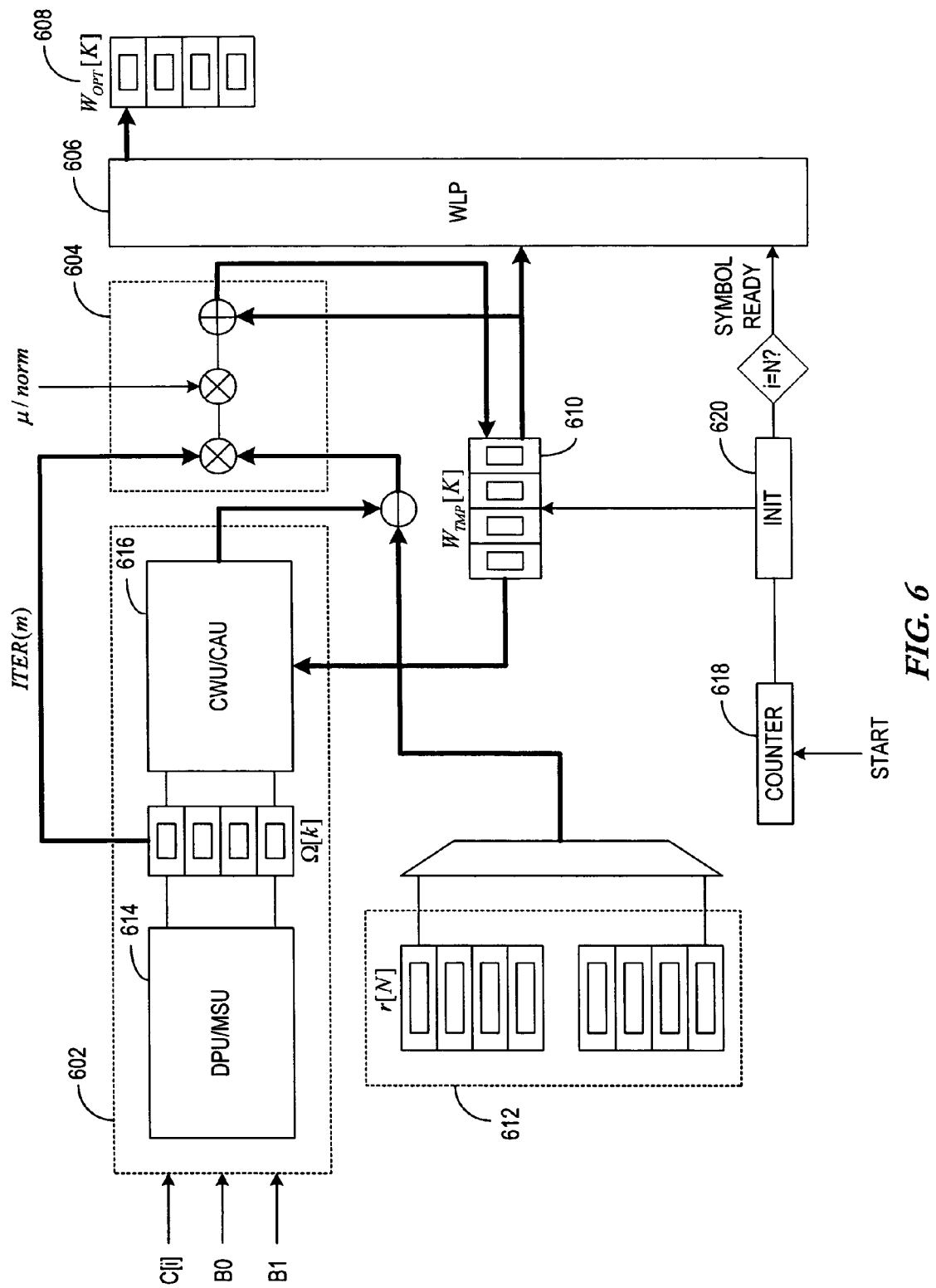
FIG. 6 illustrates an exemplary loop structure for updates in chip-basis for each symbol in accordance with the present invention.

Referring back to equations (10) and (11) as described above, a correspondence to top-level loop structures, L1 and L2, may be derived. The L1 loop represents the recursive loop for the updates in chip-basis for each symbol per equation (10), while the L2 loop updates the weight estimates from registers to memory blocks when one symbol is ready per equation (11). Loops L1 and L2 are mapped to hardware units as exemplified in the block diagram of FIG. 6.

Loop L1 is exemplified by two, second level loops illustrated by blocks 602 and 604. Blocks 602 and 604 correspond to user indices in which block 602 computes the weighted estimation of the received signal based on the current weights and block 604 computes the iterative weights for K users. According to the loop structures for code index, k, and chip index, i, the NLMS block may be partitioned into two major functions: the Weighted Sum Function (WSF) of block 602 as described by equation (10) and the Weighted Adaptation Function (WAF) of block 604 as described by equation (11).

In WSF block 602, the estimated hard-decision bits are extracted from the bit vectors B0 and B1 by the De-Packing Unit (DPU) of block 614. The $$\hat{\Omega}^{(m-1)}(i) = [c_1(i)\hat{s}_1^{(m-1)} c_2(i)\hat{s}_2^{(m-1)} \ldots c_k(i)\hat{s}_k^{(m-1)}]^T \quad (24)$$

omega vector of equation (24) is generated using the same Modulator Spreader Unit (MSU) as in the transmitter from the estimated bits and the spreading code vector C[i] and is subsequently stored either in memory blocks or register files. In the same loop structure, Chip-Weighting-Unit (CWU)/Complex-Add-Unit (CAU) 616 generates the weighted sum of the replica as described in equation (10). The replica of the received signal is then subtracted from the received chip samples to form the residual error as in equation (16). The omega vector of equation (24) and the residual error of equation (16) are then sent to WAF block 604.

The omega vector is first multiplied by the residue and is then multiplied by the factor, μ/norm. This quantity is then added to the previous iteration of the weights and written back to $W_{tmp}[K]$ space 610. The process is repeated iteratively for all the chips in one symbol. Once the weights are ready for each symbol, Weight Load Process (WLP) 606 loads the optimal weights 608 for interference cancellation.

Ping-pong buffer 612 is designed to store the input chip samples of the next symbol while the NLMS block is computing the weights. In the NLMS L1 structure, counter 618 controls the iteration, whereby for the first chip of each symbol, the initial values 620 of the weight vector of equation (25) are set to be the channel estimation for each user scaled by SCALE_NUM=$2^{B_W}$, where $B_W$ is the bit-width for the scaling system.

$$W^{(m)}(i) = \text{round}\{[\hat{\alpha}_1 \hat{\alpha}_2 \ldots \hat{\alpha}_K]^* \text{SCALE\_NUM}\}. \quad (25)$$

As a summary, the scripts of WSF 602 and WAF 604 loops are illustrated in code segments (26) and (27), respectively.

```
for k=0; K-1{
    if (i==0){w^re(k)=SCALE NUM; w^im(k)=0;} // initialization
    Ω̂^re[k]= {1-2*[(C_i >> k)&1]}*{1-2*[(B_0 >> k)&1]};           (26)
    Ω̂^im[k]= {1-2*[(C_i >> k)&1]}*{1-2*[(B_0 >> k)&1]};
    r̂_W^re += {w^re[k] Ω̂^re[k]-w^im[k] Ω̂^im[k]}
    r̂_W^im += {w^re[k] Ω̂^im[k]-w^im[k] Ω̂^re[k]}
}
for k = 0; K-1{
    ℑ^re=ε^re * Ω̂^re[k] + ε^im * Ω̂^im[k];
    ℑ^im=ε^im * Ω̂^re[k] - ε^im * Ω̂^re[k];
    w^re[k] = w^re[k]+(μ* ℑ^re)>>B_w]>>logK;                      (27)
    w^im[k] = w^im[k]+(μ* ℑ^im)>>B_w]>>logK;
    if(i==N){
        w^re_opt[k] = w^re[k];      w^im_opt[k] = w^im_opt[k];
    }
}
```

In WSF block 602, a vector processing of the modulation is formed for all K users. In WAF block 604, a computation of the norm of the $\hat{\Omega}^{re}[k]$, $\hat{\Omega}^{im}[k]$ vector is needed. A straightforward computation of the norm for the omega vector is given as $$\|\hat{\Omega}\|^2 = \sum_{k=1}^{K}[\hat{\Omega}^{re}(k)*\hat{\Omega}^{re}(k) + \hat{\Omega}^{im}(k)*\hat{\Omega}^{im}(k)]. \quad (28)$$

Equation (28) has the complexity of 2K multiplications and (K-1) additions. If $\hat{\Omega}^{re}[k]$, $\hat{\Omega}^{im}[k]$ are stored in memory arrays, then the complexity increases by 2K memory reads. However, since $\hat{s}_1^{(m-1)} \in \{\pm 1 \pm j\}$ and $c_k(i) \in \{\pm 1\}$ for QPSK, the norm need not be computed for each symbol individually. It can be shown that the quantity $\|\hat{\Omega}\|^2 = 2K$ is a constant, thus the division may be implemented by the right shift of $\log_2(2K)$. Since the step size μ does not need to be a very accurate value, combination of μ and the norm into one coefficient is possible followed by a right shift only by $\log_2(K)$, which may be computed as a constant offline.

Conventional designs implementing the MSU and CWU of blocks 602 and 604 requires 6 multiplications and a tree layout for the CAU of block 616 for a fully pipelined summation of K users. However, since $\hat{S}^{re}(k)$, $\hat{S}^{im}(k)$, $\hat{\Omega}^{re}(k)$, $\hat{\Omega}^{im}(k)$, and $C_i(k)$ take on values from $\{+/-1\}$, $\{0,1\}$ is used instead to represent these values and K users may then be packed into vector words $B_0$, $B_1$, and $C_i$. The bit-ware values are extracted from the vector words as: $b_0=(B_0>>k)\&1$; $b_1=(B_1>>k)\&1$; and $C_k(i)=(C[i]>>k)\&1$. The actual values of $\hat{\Omega}^{re}(k)$, $\hat{\Omega}^{im}(k)$ may be derived from a truth table based on different input bits of the spreading code and the hard decision bits as shown in Table 2. In addition, by using {0,1} instead of {+/-1} to represent $\hat{\Omega}^{re}(k)$ and $\hat{\Omega}^{im}(k)$,

TABLE 2

| $C_k(i)$ | b0 | b1 | $\hat{\Omega}^{re}(k)$ | $\hat{\Omega}^{im}(k)$ |
|---|---|---|---|---|
| 0 | 0 | 0 | -1 | -1 |
| 0 | 0 | 1 | 1 | -1 |
| 0 | 1 | 0 | -1 | 1 |
| 0 | 1 | 1 | 1 | 1 |
| 1 | 0 | 0 | 1 | 1 |
| 1 | 0 | 1 | -1 | 1 |
| 1 | 1 | 0 | 1 | -1 |
| 1 | 1 | 1 | -1 | -1 | the logic design is shown to be:

$$\hat{\Omega}^{re}(k)=[(C_i>>k)\&1]\}XOR\{[(B_0>>k)\&1]\}; \quad (29)$$

$$\hat{\Omega}^{im}(k)=[(C_i>>k)\&1]\}XOR\{[(B_1>>k)\&1]\}; \quad (30)$$

The multiplication of $\hat{\Omega}^{(m-1)}$ with 2-bit values {+/-1} as in equations (10) and (11) may be implemented with Multiplexer (MUX) circuits controlled by the decoder of $\hat{\Omega}^{re}(k)$ and $\hat{\Omega}^{im}(k)$ with 1-bit values {0,1}. The multiplications in equation (10) may then be implemented as Sumsub-MUX-Unit (SMU) for Weighted symbols (SMUw), $$\begin{cases} \hat{r}_{Wsum} = w^{re}[k] + w^{im}[k] \\ \hat{r}_{Wsub} = w^{re}[k] - w^{im}[k] \end{cases}, \quad (31)$$

$$\begin{cases} \hat{r}_W^{re} += A_{re} \quad A_{re} \in \{\pm \hat{r}_{Wsum}, \pm \hat{r}_{Wsub}\}; \\ \hat{r}_W^{im} = A_{im} \quad A_{im} \in \{\pm \hat{r}_{Wsum}, \pm \hat{r}_{Wsub}\}; \end{cases}$$

The same structure can be used for $[\hat{\Omega}^{(m-1)}(i)]^* \epsilon^{(m)}(i)$ in equation (11) as an SMU block for Error (SMUe).

$$\begin{cases} \hat{\epsilon}_{sum} = \epsilon^{re} + \epsilon^{im} \quad \mathcal{I}^{re} \in \{\pm \hat{\epsilon}_{sum}, \pm \hat{\epsilon}_{sub}\}; \\ \hat{\epsilon}_{sub} = \epsilon^{re} - \epsilon^{im} \quad \mathcal{I}^{im} \in \{\pm \hat{\epsilon}_{sum}, \pm \hat{\epsilon}_{sub}\}; \end{cases} \quad (32)$$

Figure 7:
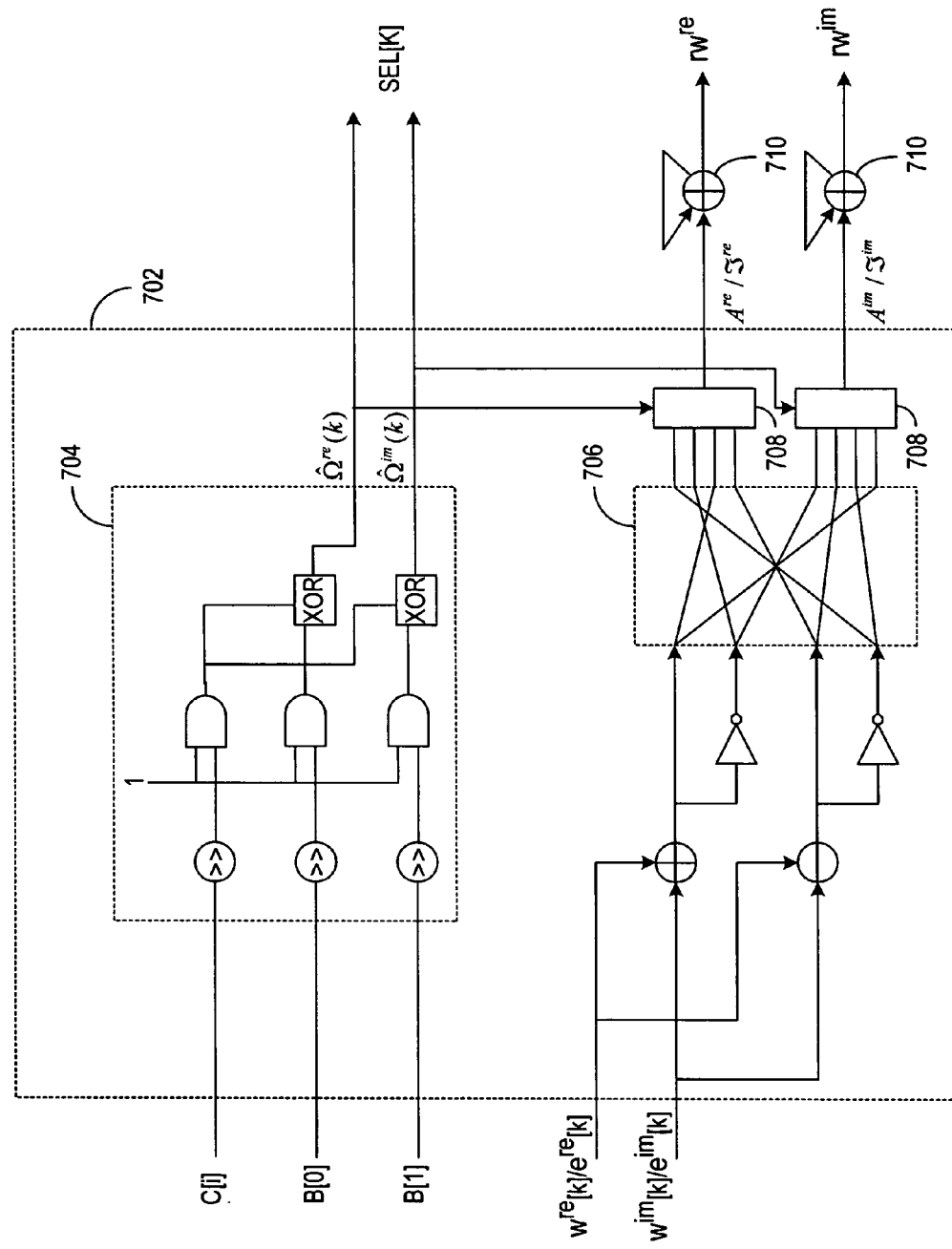
FIG. 7 illustrates an exemplary block diagram of a basic Sumsub-MUX-Unit (SMU) design block in accordance with the present invention.

The circuit logic for one SMUw/SMUe 702 is depicted in FIG. 7, where only the sign and input to accumulators 710 are controlled by 4-way MUX 708. The difference between whether SMU 702 operates as an SMUw or an SMUe is determined by the inputs to MUXs 708 and the configuration of Connection Network (CN) 706. Select decoder 704 generates the SEL[K] signals to replace the original omega vector, which are then used to control MUXs 708 as illustrated in Table 3. It should be noted that Table 3 determines the configuration of CN 706 for both the SMUw and SMUe configurations of SMU 702.

TABLE 3

| $\hat{\Omega}^{re}(k) \hat{\Omega}^{im}(k)$ | $A^{re}$ | $A^{im}$ | $\mathcal{I}^{re}$ | $\mathcal{I}^{im}$ |
|---|---|---|---|---|
| 00 | $-\hat{r}_{Wsub}$ | $-\hat{r}_{Wsum}$ | $-\hat{\epsilon}_{sum}$ | $\hat{\epsilon}_{sub}$ |
| 01 | $-\hat{r}_{Wsum}$ | $\hat{r}_{Wsub}$ | $-\hat{\epsilon}_{sub}$ | $-\hat{\epsilon}_{sum}$ |
| 10 | $\hat{r}_{Wsum}$ | $-\hat{r}_{Wsub}$ | $\hat{\epsilon}_{sub}$ | $\hat{\epsilon}_{sum}$ |
| 11 | $\hat{r}_{Wsub}$ | $\hat{r}_{Wsum}$ | $\hat{\epsilon}_{sum}$ | $-\hat{\epsilon}_{sub}$ |

Figure 8:
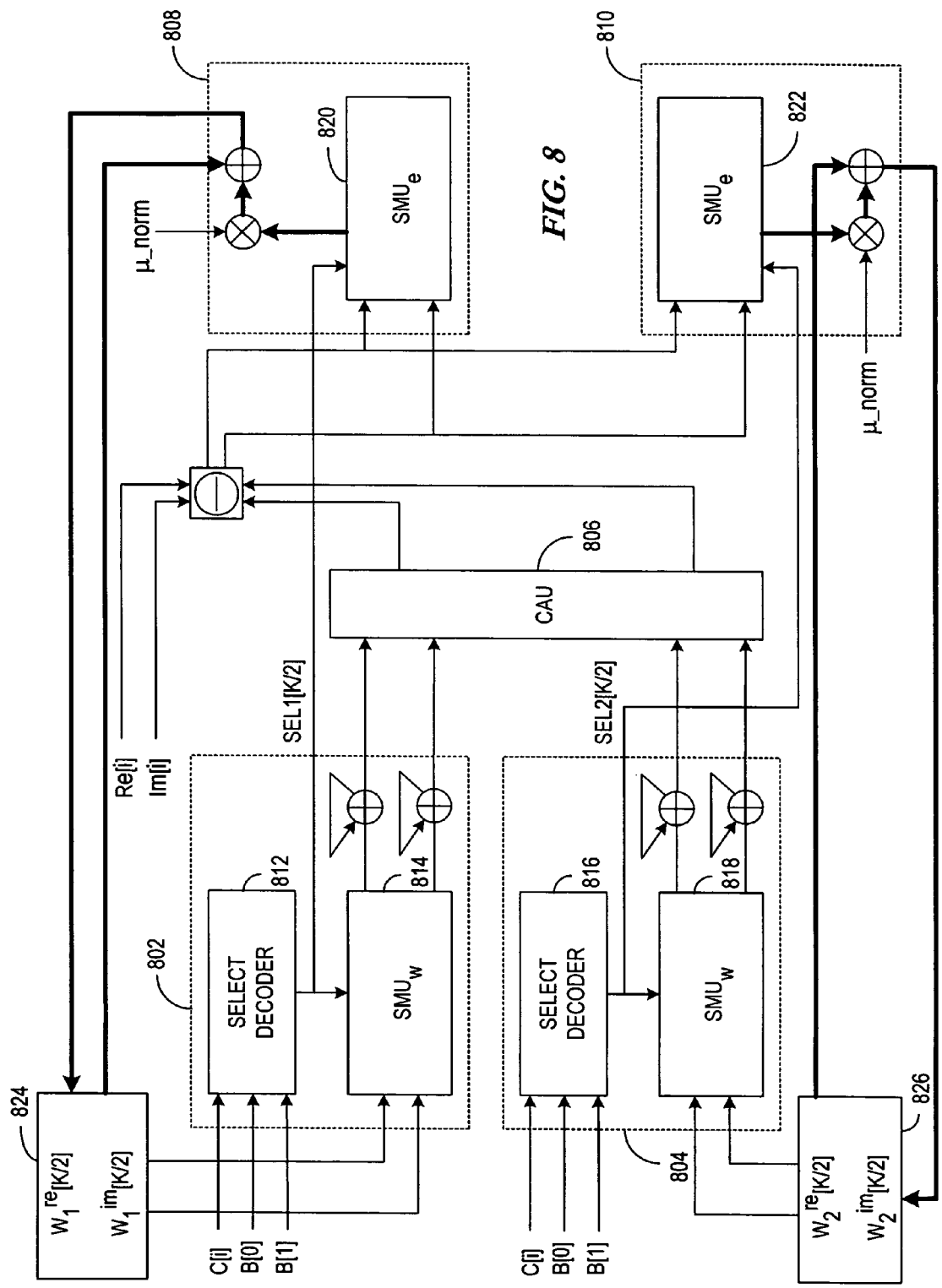
FIG. 8 illustrates an exemplary block diagram of a parallel orientation of the basic SMU design block of FIG. 7.

Referring back to FIG. 6, it can be seen that WSF block 602 and WAF block 604 for the NLMS algorithm may be integrated using the basic SMU design block of FIG. 7 as discussed above. In one embodiment according to the present invention, for example, a parallel orientation of two SMUw and SMUe engines is illustrated in FIG. 8. In the WSF function of blocks 802 and 804, K users are partitioned into two blocks of K/2 users, whereby select decoders 812 and 816 receive the respective C[i], B[0], and B[1] bit streams to generate select signals, SEL1[K/2] and SEL2[k/2], for SMUw 814 and 818. SMUw 814 and 818 also receive inputs from temporary weight memory blocks 824 and 826.

CAU 806 adds the two portions of paths to get the total weighted sum chip signal, which is then subtracted from the received original signal, Re[i] Im[i], to generate the error signal and then forwarded onto SMUe 820 and 822 of WAF blocks 808 and 810, respectively. Once the total weighted sum chip signal is multiplied by signal μ_norm, it is adjusted by the weights from the previous iteration and written back to temporary weight memory blocks 824 and 826. In this way, each engine acts as a single processor for serial processing of K/2 users, which represents a significant improvement in optimization of VLSI area and timing closure as compared to conventional multiplier designs.

In another embodiment according to the principles of the present invention, the basic SMU design block of FIG. 7 may also be used to implement Weighted-Sum-Matched-Filter (WSMF) and Residual-Compensation (RC) blocks as described above by equations (15) through (19). Similarly to the NLMS block of FIG. 8, the symbol level Sum-sub-MUX-Unit for Weighted Symbol (SMUws) block diagram of FIG. 9 may be designed with bit-ware combinational logic to generate ws[k] as computed by equation (20). In such an instance, SMUws 908 is controlled only by select decoder 914, which is triggered by the B[0] and B[1] vectors. A MUX internal to Weight-Matching-Filter-Unit (WMFU) 910 is controlled by the spreading code, C[i], to accumulate the optimal weighted sum chip signal, $\hat{r}_{W,opt}(i)$, when WMFU 910 is accumulating on user index k.

Figure 9:
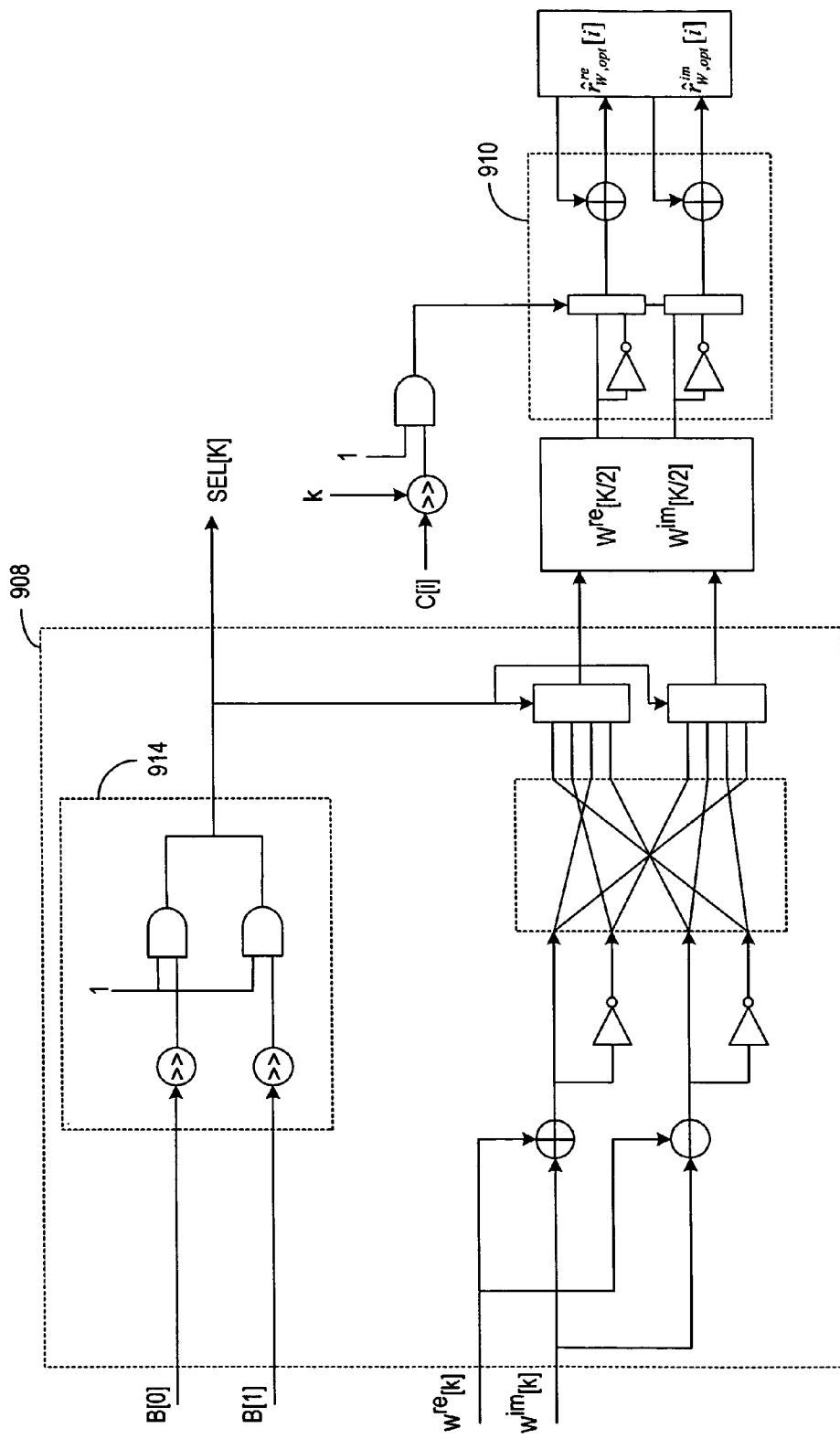
FIG. 9 illustrates an exemplary SMU Weighted Symbol (SMUws) block diagram in accordance with the present invention.
Figure 10:
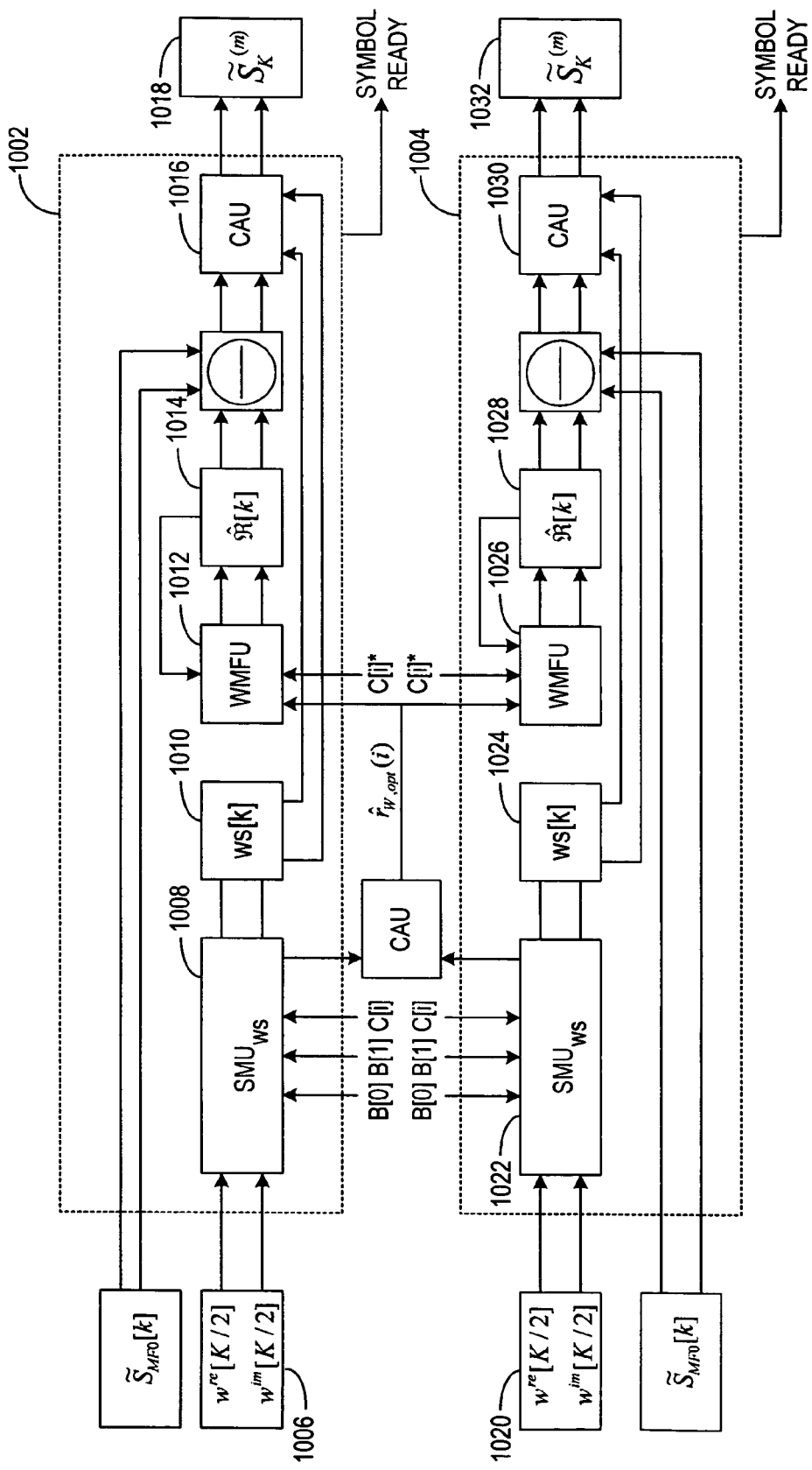
FIG. 10 illustrates an exemplary block diagram for the Weighted-Sum-Matched-Filter (WSMF) and Residual-Compensation (RC) in accordance with the present invention.

Based on the basic SMUws design module as exemplified in FIG. 9, the complete data path logic block diagram for the WSMF and PRC process as described by equations (15) through (19) may now be illustrated as in FIG. 10. Parallel PEs 1002 and 1004 are built from combinational logic to operate on two groups of K/2 users, where the users in each group utilize their respective PE in serial. In each of PEs 1002 and 1004, optimal weights, 1006 and 1020, are input to each of SMUws 1008 and 1022 to compute weighted symbols, ws[k] 1010 and ws[k] 1024, and the weighted sum chip signal, $\hat{r}_{w,opt}(i)$. The weighted sum chip signal is then detected by WMFU 1012 and 1026 to form signals $\Re$[k] 1014 and 1028, which are then subtracted from the $k^{th}$ user's symbol estimation, $\tilde{S}_{MF0}[k,]$, and added according to weighted symbols 1010 and 1024. The process concludes by finding the matched filter output of the interference cancelled signal, $\tilde{S}$[m], 1018 and 1032. Once an entire symbol has been accumulated, signal SYMBOL READY is asserted to alert the demodulator unit to read the symbol estimates.

It should be noted that the architecture of FIG. 10 does not require the use of general purpose multipliers as are conventionally used. Accordingly, bit-level combinational logic VLSI architectures may be used to achieve a significant improvement in clock rate as well as a reduction in the number of Configurable Logic Blocks (CLBs) required for the design. The clock rate improvement facilitates a larger time resource for the processing of each user and each chip.

As discussed above, the VLSI architectures according to the present invention are implemented with the Precision-C methodology. In an exemplary design implementation, real-time design specifications may be analyzed with the Precision-C methodology that corresponds to WCDMA and the High Speed Downlink Packet Access (HSDPA) system for WCDMA. In particular, the chip rate for downlink wireless multimedia services for these systems is 3.84 MHz with a spreading gain of 16. Given a working clock rate of 38.4 MHz, a 10-cycle resource is created for each chip and a 160-cycle resource is created for each symbol.

The latency for a particular design is determined by the ratio of the number of cycles required to the working clock rate as $$T_L = N_{cycle}/f_{clk}. \quad (33)$$

Equation (33) thus indicates that two variables may be used to decrease the latency: either reduce the number of cycles required, $N_{cycle}$; or increase the frequency of the working clock, $f_{clk}$. For a PE with several different functional units, the critical path determines the highest clock rate that is achievable. Since the latency in the critical path is the accumulation of latency of all the functional units, retiming is usually needed to increase the clock frequency. However, when the design becomes complex, retiming using traditional design methodology is extremely difficult when design specifications change.

Tradeoffs exist between speed and size when consideration is given to the different types of storage hardware that may be utilized. If register files are applied to map the data arrays, for example, they can be accessed in parallel in one cycle. Thus, use of register files tends to provide increased parallelism. On the other hand, if multiple register files are needed to share multiple functional units, MUXs are required to control the inputs to the multiple functional units. Since MUXs can be a major contribution to design size, however, added parallelism often results in designs that require more chip area.

Thus, an investigation into the various mapping and pipelining options is desirable in order to maximize the efficiency of the VLSI implementation using various architecture constraints. In addition, such an investigation through synthesis yields an enlightening comparison between the multiplier-based architectures and the SMU based architectures in accordance with the present invention. For example, an optimization of a multiplier based NLMS architecture yields a design requiring 2697 CLBs, 91 block multipliers, 147 cycles, and a working clock frequency of 48.4 MHz. An optimized SMU based NLMS architecture in accordance with the present invention, on the other hand, yields an exemplary design requiring 3477 CLBs, 9 ASIC multipliers, 151 cycles, and a working frequency of 59 MHz. Thus, while the SMU based design remains within the 160-cycle resource constraint, it additionally provides an improvement in the working frequency along with a factor of 10 decrease in the required number of multipliers. Similar results can be obtained for the other SMU based architectures discussed herein.

The present invention contemplates an adaptive PRC algorithm for MAI suppression in CDMA systems. The algorithm in accordance with the present invention contemplates the utilization of a set of weights to increase the confidence level and improve the accuracy of the interference cancellation as compared to the conventional PIC and PPIC algorithms. In addition, the computational architecture of the adaptive PRC is optimized to reduce the redundant computation and to facilitate efficient VLSI design. The efficiency of the VLSI design is accomplished in large part due to the utilization of combinational logic circuits in order to avoid the use of dedicated ASIC multipliers.

The foregoing description of the exemplary embodiment of the invention has been presented for the purposes of illustration and description. It is not intended to be exhaustive or to limit the invention to the precise form disclosed. Many modifications and variations are possible in light of the above teaching. For example, tradeoffs between the speed and the size of the adaptive PRC algorithm's architecture may be conducted in order to prioritize one design constraint over another. In such a case, size may have a higher priority than speed, thus allowing the number of CLBs required by a particular architecture to be decreased, while at the same time decreasing the maximum frequency of the working clock. It is intended that the scope of the invention be limited not with this detailed description, but rather determined by the claims appended hereto.

What is claimed is:

1. An apparatus comprising:
a matched filter stage coupled to receive a multiuser signal and configured to provide data symbols representing demodulated bit stream groupings for each user;
a signal reconstructor coupled to receive the data symbols and configured to generate modulated representations for each users' data symbols to produce a replica of the multiuser signal;
a Normalized Least Mean Square (NLMS) block coupled to receive the replica of the multiuser signal and configured to compute a weighted estimation of the replica, wherein the NLMS block is configured to:
multiply the replica of the multiuser signal by a spreading code vector to extract a hard decision bit vector for each chip of the replica, wherein at least one chip exists per data symbol;
multiply the hard decision bit vector by an accumulated symbol weight value to produce a weighted estimation for each chip of the replica;
subtract the multiuser signal from the weighted estimation for each chip of the replica to produce a residue signal;
add the accumulated symbol weight value to a product of the residue signal and the hard decision bit vector; and
provide a final symbol weight value once weights for each chip of the data symbol accumulate to form the weighted estimation of the replica; and
a parallel compensation residue (PRC) block coupled to receive the weighted estimation of the replica and the multiuser signal and configured to generate a common residual error signal from the weighted estimation of the replica and the multiuser signal, wherein the common residual error signal is subtracted from each users' data symbols to cancel interference associated with each users' data symbols.

2. The apparatus according to claim 1, wherein the NLMS block comprises a memory block coupled to store the hard decision bit vector for each chip of the replica.

3. A method comprising:
demodulating a multiuser signal to form bit streams associated with each user of the multiuser signal;
generating a replica of the multiuser signal from the bit streams associated with each user of the multiuser signal;
demodulating the replica of the multiuser signal to obtain modulation symbols, wherein one or more chips are associated with each modulation symbol;
accumulating a weighted value for each chip of the replica of the multiuser signal;
subtracting the weighted value for each chip of the replica from the multiuser signal to produce a residual signal;
multiplying the modulation symbols by the residual signal;
adding the multiplied modulation symbols to the accumulated weighted value for each chip to form a weighted estimation of the multiuser signal;
generating a common residual signal using a subtraction of the weighted estimation of the multiuser signal from the multiuser signal;
compensating each user's signal with the common residual signal to obtain an interference cancelled signal for each user; and
filtering the interference cancelled signal for each user to obtain estimates of each user's transmitted symbols.

4. The method according to claim 3, further comprising storing the modulation symbols for each chip of the replica of the multiuser signal.

5. An apparatus comprising:
a signal reconstruction circuit coupled to receive a multiuser signal and configured to provide data symbols representing demodulated bit stream groupings for each user and configured to generate modulated representations for each users' data symbols to produce a replica of the multiuser signal;
a Normalized Least Mean Square (NLMS) circuit coupled to receive the replica of the multiuser signal and configured to accumulate first and second weighting signals generated as a difference between the multiuser signal and a weighted replica of the multiuser signal, the replica of the multiuser signal including a first spreading code bit stream and first and second data streams, wherein the NLMS circuit comprises:
a) a first select decoder coupled to receive the first spreading code bit stream and the first and second data streams and configured to generate first and second select signals in response to respective bit values of the first spreading code bit stream and first and second data streams;
b) a first multiplexer circuit coupled to receive the first and second select signals and the first and second weighting signals and configured to provide accumulations of a sum of the first and second weighting signals, wherein a sign of the first and second weighting signals is determined by the first and second select signals; and
c) a second multiplexer circuit coupled to receive the first and second select signals and first and second error signals and configured to provide a sum of the first and second error signals, wherein a sign of the first and second error signals is determined by the first and second select signals; and
a parallel compensation residue (PRC) circuit coupled to receive the weighted replica of the multiuser signal and configured to generate first and second error signals from the weighted replica of the multiuser signal, wherein the first and second error signals are subtracted from each users' data symbols to cancel interference associated with each users' data symbols.

6. The apparatus according to claim 5, wherein the first select decoder comprises combinational logic gates to generate the first and second select signals.

7. The apparatus according to claim 6, wherein the combinational logic gates include:
a first exclusive-or gate, wherein an exclusive-or of the first spreading code bit stream with the first data stream generates the first select signal; and
a second exclusive-or gate, wherein an exclusive-or of the first spreading code bit stream with the second data stream generates the second select signal.

8. The apparatus according to claim 5, wherein the first multiplexer circuit comprises:
a summer coupled to receive the first and second weighting signals and configured to provide a sum of the first weighting signal with the second weighting signal as a first output and an inverted sum of the first weighting signal with the second weighting signal as a second output; and
a subtractor coupled to receive the first and second weighting signals and configured to provide a difference between the first weighting signal and the second weighting signal as a first output and an inverted difference between the first weighting signal and the second weighting signal as a second output.

9. The apparatus according to claim 8, wherein the first multiplexer circuit further comprises a first multiplexer coupled to receive the first and second outputs of the summer and the subtractor and configured to select one of the first and second outputs of the summer and the subtractor in response to the first select signal.

10. The apparatus according to claim 9, wherein the first multiplexer circuit further comprises a second multiplexer coupled to receive the first and second outputs of the summer and the subtractor and configured to select one of the first and second outputs of the summer and the subtractor in response to the second select signal.

11. The apparatus according to claim 9, wherein the first multiplexer circuit further comprises a connection network coupled to route the first and second outputs of the summer and the subtractor to the first and second multiplexers in accordance with a predetermined routing scheme.

12. The apparatus according to claim 5, wherein the second multiplexer circuit comprises:
a summer coupled to receive the first and second error signals and configured to provide a sum of the first error signal with the second error signal as a first output and an inverted sum of the first error signal with the second error signal as a second output; and
a subtractor coupled to receive the first and second error signals and configured to provide a difference between the first error signal and the second error signal as a first output and an inverted difference between the first error signal and the second error signal as a second output.

13. The apparatus according to claim 12, wherein the second multiplexer circuit further comprises a first multiplexer coupled to receive the first and second outputs of the summer and the subtractor and configured to select one of the first and second outputs of the summer and the subtractor in response to the first select signal.

14. The apparatus according to claim 13, wherein the second multiplexer circuit further comprises a second multiplexer coupled to receive the first and second outputs of the summer and the subtractor and configured to select one of the first and second outputs of the summer and the subtractor in response to the second select signal.

15. The apparatus according to claim 14, wherein the second multiplexer circuit further comprises a connection network coupled to route the first and second outputs of the summer and the subtractor to the first and second multiplexers in accordance with a predetermined routing scheme.

16. A method comprising:
establishing two parallel processing paths to operate on two groups of users, wherein each processing path is implemented with combinational logic to serially operate on each group of users, the serial operation including,
estimating symbols for each user of a group of users;
generating a weight select signal using the estimated symbols for each user of the group of users to compute weighted symbols for each user of the group of users;
computing weighted sum chip signals for each user of the group of users using the weight select signal to select the weighted symbols from a plurality of weighted symbol combinations;
generating a detected bit vector from the weighted sum chip signals for each user;
generating a difference between each bit of the detected bit vector and each user's symbol estimation;
adding the difference to the weighted symbols for each user; and
generating an interference canceled signal for each symbol once all bits of the detected bit vector are processed.

17. The method according to claim 16, further comprising generating a matched filter output of the interference canceled signal.

* * * * *